(12) United States Patent
Kashimoto

(10) Patent No.: US 7,974,267 B2
(45) Date of Patent: Jul. 5, 2011

(54) TELEPHONE SYSTEM, AND MAIN UNIT AND TERMINAL REGISTRATION METHOD THEREFOR

(75) Inventor: Shinichi Kashimoto, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 176 days.

(21) Appl. No.: 12/242,461

(22) Filed: Sep. 30, 2008

(65) Prior Publication Data

US 2009/0154449 A1    Jun. 18, 2009

(30) Foreign Application Priority Data

Dec. 17, 2007  (JP) ................................ 2007-325141

(51) Int. Cl.
 H04L 12/66  (2006.01)
(52) U.S. Cl. ....................................................... 370/351
(58) Field of Classification Search .................. 370/352, 370/351, 401, 389, 395, 400; 379/368, 110, 379/356, 93; 455/456, 405, 110, 356, 567, 455/458, 414, 522
See application file for complete search history.

(56) References Cited

U.S. PATENT DOCUMENTS

| 6,061,570 | A * | 5/2000 | Janow | ........................... | 455/458 |
| 7,069,436 | B1 * | 6/2006 | Akachi | ........................ | 713/162 |
| 2004/0023641 | A1 * | 2/2004 | Tsutsumi et al. | ............. | 455/411 |
| 2005/0014503 | A1 * | 1/2005 | Nakakita et al. | ........... | 455/435.1 |
| 2008/0282331 | A1 * | 11/2008 | Teo | .................................. | 726/6 |

FOREIGN PATENT DOCUMENTS

| JP | 2002-34063 | 1/2002 |
| JP | 2005-27083 | 1/2005 |
| JP | 2005-117355 | 4/2005 |

* cited by examiner

*Primary Examiner* — Pankaj Kumar
*Assistant Examiner* — Prenell P Jones
(74) *Attorney, Agent, or Firm* — Blakely, Sokoloff, Taylor & Zafman LLP

(57) ABSTRACT

According to one embodiment of the invention, there is provided a telephone system comprises a plurality of telephone terminals and a main unit. The main unit comprises an authentication processing unit performs login authentication MAC address authentication, and a mode specification unit receives specification of a plural terminal registration mode. The MAC address authentication refuses logins from telephone terminals differing in MAC address from a telephone terminal that has been allowed to log in firstly even if the logins are made by the same extension numbers. The plural terminal registration mode exclusively allows the simultaneous login by the same extension numbers from a plurality of telephone terminals having different MAC addresses. The authentication processing unit gives priority over the plural terminal registration mode higher than the MAC address authentication and makes the MAC address authentication void in the plural terminal registration mode.

16 Claims, 7 Drawing Sheets

| DN | MAC authentication | Plural registration | Priority over plural registration |
|---|---|---|---|
| 1000 | ☐ | ☐ | ☐ |
| 2000 | ☑ | ☑ | ☑ |
| 3000 | ☑ | ☐ | ☐ |
| 4000 | ☑ | ☑ | ☐ |
| 5000 | ☑ | ☐ | ☐ |

US 7,974,267 B2

TELEPHONE SYSTEM, AND MAIN UNIT AND TERMINAL REGISTRATION METHOD THEREFOR

CROSS-REFERENCE TO RELATED APPLICATIONS

This application is based upon and claims the benefit of priority from Japanese Patent Application No. 2007-325141, filed Dec. 17, 2007, the entire contents of which are incorporated herein by reference.

BACKGROUND

1. Field

The invention relates to a telephone system for use in as a private extension telephone system, etc., and a main unit and a terminal registration method therefor. More specifically, the present invention relates to an improvement of a system in which a key telephone system and an Internet Protocol (IP) telephone terminal are combined.

2. Description of the Related Art

In recent years, as regards a telephone system, Voice over IP (VoIP) which enable voice communication over an IP network has become mainly used. This kind of system includes a login/logout function which is similar to a function applied to personal computers. Under this function, when logging in from a telephone terminal to the system, a user may use the terminal, by which the user has logged in, as a terminal specifically for his/her use. That is, the user may utilize original setting of a button function, telephone directory data, etc., without any concerns for the presence of himself/herself.

In authentication of a telephone terminal resulting from a login operation, a system referred to as media access control (MAC) address authentication has been generally used (e.g., refer to Jpn. Pat. Appln. KOKAI Publication No. 2005-117355). In this system, for performing the login operation, a password, and an extension number and an MAC address of the telephone terminal are reported to a main unit. The main unit refers to the information, and if the main unit OK'd the MAC address authentication, the main unit returns the fact to the terminal at a login origin, and completes the registration of the terminal in the system.

Meanwhile, a plurality of terminals which are located at different places request registration with the identical extension numbers in any cases. Under a service function frequently used and so called a mobile number, such requests are made often. For such a case, for example, the following (1)-(3) are possible approaches. 'A currently registered terminal' means a terminal which is registered at present, and 'a new registration requesting terminal' means a terminal which has requested later with the same number as that of the currently registered terminal.

(1) Takes preference the new registration requesting terminal and erases the registration of the currently registered terminal.

(2) Registers the new registration requesting terminal in addition to the currently registered terminal.

(3) If the currently registered terminal has been in speech when the new registration requesting terminal requested its registration, restricts the registration of the new registration requesting terminal.

The MAC address authentication are harder restricted than any of the given approaches (1)-(3), even if the user logs in with the identical extension numbers and passwords, only one terminal which has firstly requested its registration may be authenticated. To allow the registration for a plurality of terminals, a maintenance operator has to disable the MAC address authentication by a manual operation. Meanwhile, from the point of view of security, it is preferable to adopt the MAC address authentication; it has been required to cope with both security and convenience in some kind of forms. Further, it is needed to take time and effort or operation omission of an operator to release the MAC address authentication, and some sort of technical development has been expected.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided a telephone system comprises a plurality of telephone terminals configured to make telephone communication via a packet network and a main unit which receives a login request from each of the telephone terminals via the packet network. The main unit comprises an authentication processing unit which performs login authentication processing for each of the telephone terminals by media access control (MAC) address authentication, and a mode specification unit which receives specification of a plural terminal registration mode. The MAC address authentication is an authentication system which refuses logins from telephone terminals differing in MAC address from a telephone terminal that has been allowed to log in firstly even if the logins are made by the same extension numbers. The plural terminal registration mode is a mode to exclusively allow the simultaneous login by the same extension numbers from a plurality of telephone terminals having different MAC addresses. The authentication processing unit gives priority over the plural terminal registration mode higher than the MAC address authentication and makes the MAC address authentication void in the plural terminal registration mode.

By taking such a measure, the telephone system may specify a plural terminal registration mode. This mode is one in which a plurality of terminals are allowed to be registered for each extension number in an exclusive manner for simultaneous allowance. The exclusive manner for simultaneous allowance means that the plurality of terminals are allowed to be registered respectively at different registration times; however they are not allowed to be registered simultaneously.

If the MAC address authentication is used as a default authentication system, and the plural terminal registration mode is specified in operation of the telephone system, the plural terminal registration mode is given priority. That is, the processing by the main unit disables the MAC address authentication, and the authentication of the new registration requesting terminal is allowed.

In other words, independent of the manual operation by an operator, only with the plural terminal registration mode specified automatically disables (turns off or voids) the MAC address authentication. Therefore, the operations by the operator become simple. Further, the authentication system may prevent competing between the MAC address authentication and the plural terminal registration, may smoothly operate the system itself, and may achieve cope with both the security and convenience.

Figure 1:
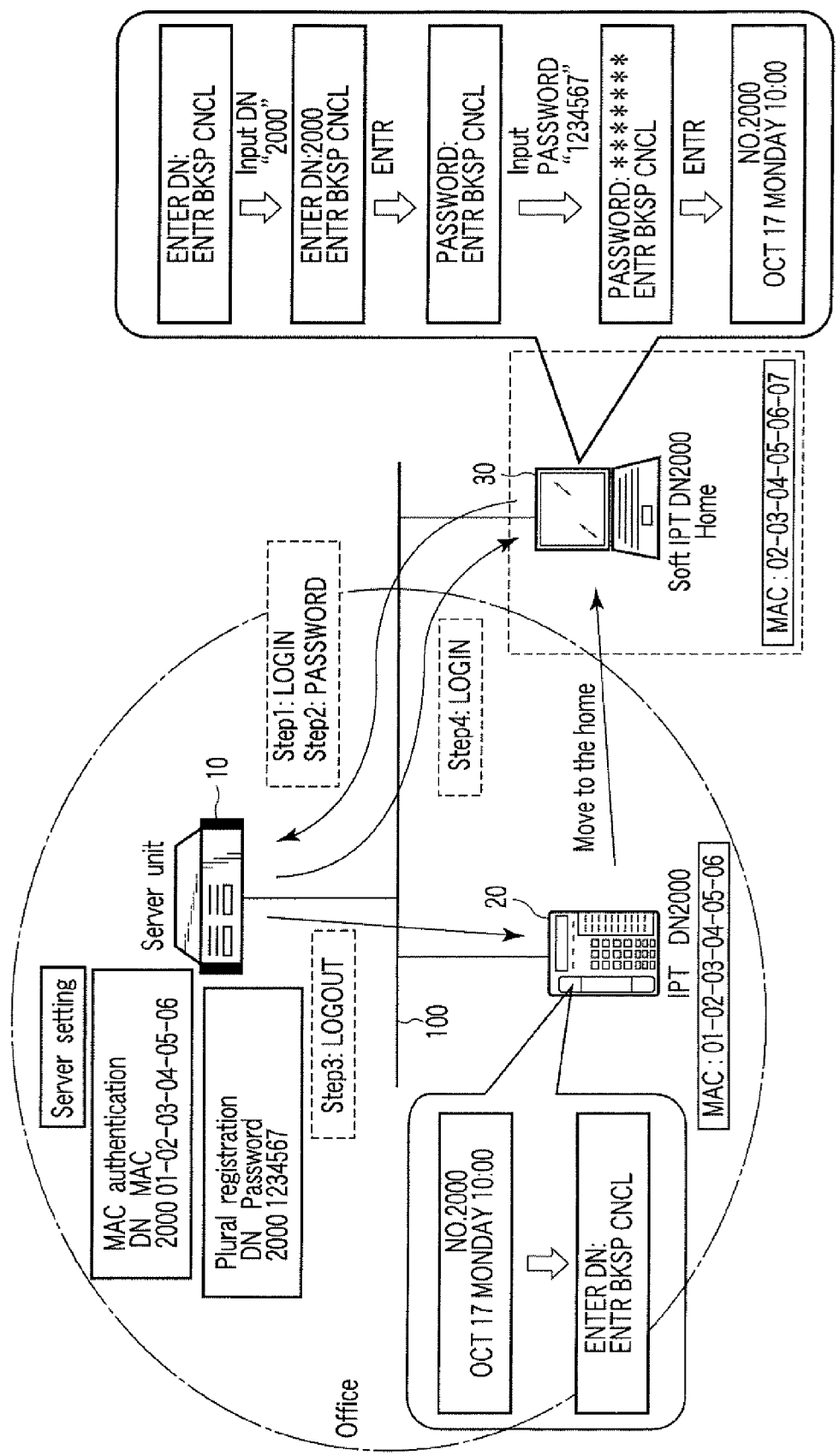
FIG. 1 is a system view depicting an embodiment of a telephone system regarding the invention.

According to an embodiment, FIG. 1 shows a system view illustrating an embodiment of a telephone system regarding the invention. The system includes a server unit 10, an IP terminal (IPT) 20, and a softphone terminal (hereinafter Soft IPT) 30. The soft IPT is a computer terminal installed telephone function software. Any of the server unit 10, TPT 20 and Soft IPT 30 is connected to a network 100 transmitting IP packets. Telephone terminals other than the IPT 20 and Soft IPT 30 are connected, and VoIP communication among terminals is established under the control by the server unit 10.

Among of the forgoing components, the server unit 10 and the IPT 20 are, for example, connected to a local area network (LAN) shared in the same office. The Soft IPT 30 may access the LAN via an IP network, such as the Internet. For instance, a form in which a user of the IPT 20 uses a personal computer terminal in home after coming home to continue business by using the same extension number DN2000 is a possible approach.

Figures 2, 3:
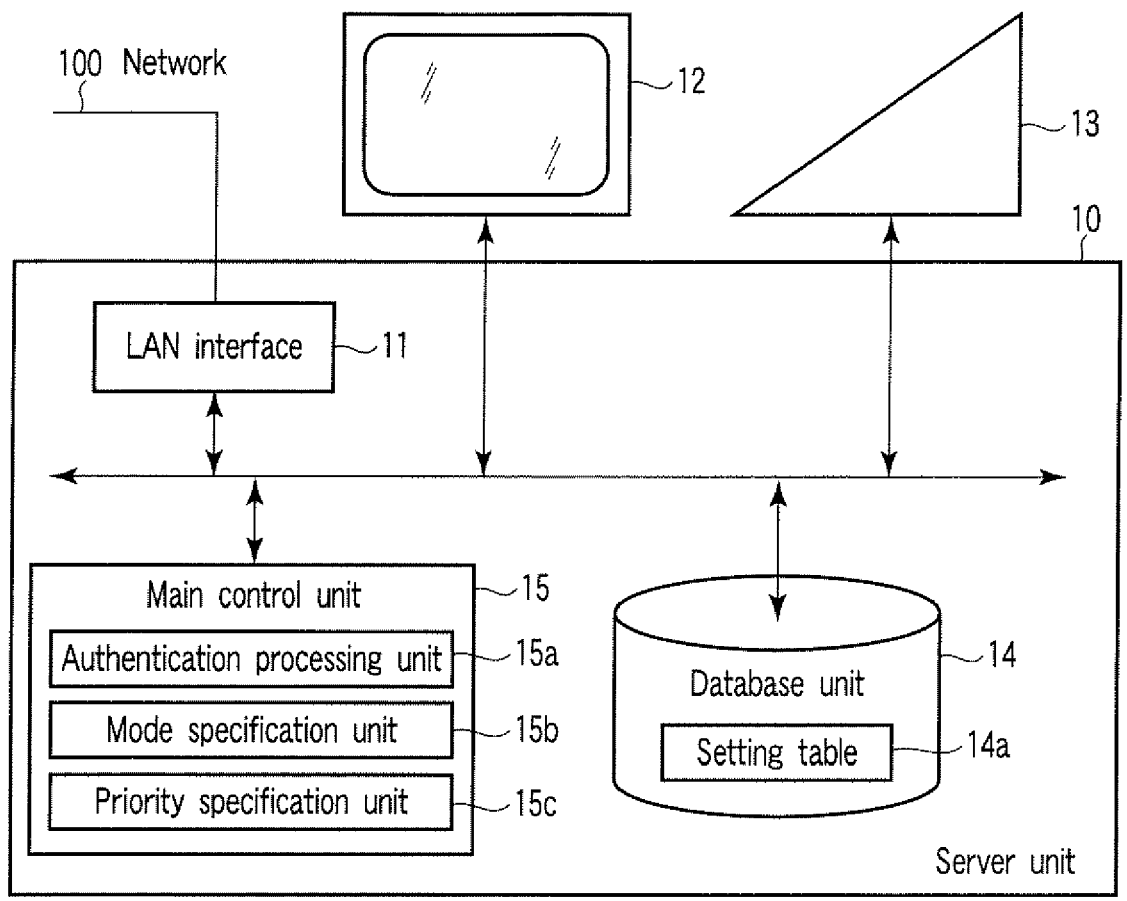
FIG. 2 is a block view depicting an embodiment of a server unit 10 of FIG. 1.
FIG. 3 is a view schematically depicting management content of a setting table 14a of FIG. 2.

FIG. 2 shows a functional block diagram illustrating one embodiment of the server unit 10 of FIG. 1. The server unit 10 includes an interface unit 11, a display unit 12, an input and output unit 13, a database unit 14 and a main control unit 15. The interface unit 11 is connected with the network 100 to take on processing regarding transmission and reception of packets. The display unit 12 provides a user interface together with the input and output unit 13, and constructs a graphical user interface (GUI) environment.

The control unit 15 includes an authentication processing unit 15a, a mode specification unit 15b and a priority specification unit 15c as new processing functions regarding the embodiment. When receiving a login request via the network 100, the processing unit 15a authenticates the terminal that is a transmission origin of the login request by means of MAC address authentication. The MAC address authentication is excellent in security by authenticating a terminal using a MAC address which is worldwide unique.

It is assumed that after a currently registered terminal logs out, a new registration requesting terminal requests for login with the same extension number as that of the currently registered terminal. Then, in the MAC address authentication, if the MAC address (after logging out) of the new registration requesting terminal is not the same as that of the currently registered terminal, the login request is refused. That is, when a plurality of login requests with the identical extension numbers are made, the login request from a telephone terminal, having a different MAC address from that of a telephone terminal of which the login has been allowed firstly, is refused. In other words, with the same extension number used, the login is allowed only from the same telephone terminal. Of course, the login of the new registration requesting terminal is refused during login of the currently registered terminal.

The mode specification unit 15b accepts so that an operator operates the input and output unit 13 to set the plural terminal registration mode to the server unit 10. The plural terminal registration mode is a mode to allow the login with the same extension numbers from a plurality of telephone terminals having different MAC addresses in an exclusive manner for simultaneous allowance. That is, in this registration mode, even if the MAC addresses are different from one another, the login of the terminals with the same extension numbers is allowed as long as the requests are not made simultaneously. Even in this mode, the new registration requesting terminal may not be logged in after logging out of the currently registered terminals.

This embodiment newly proposes a telephone system which mutually sets the order of priority for each MAC address authentication and each plural terminal registration mode. That is, in a default setting, the order of priority for the plural terminal registration mode is higher than that of the MAC address authentication, thereby, in a state in which the plurality terminal registration mode is set, the MAC address authentication is made void. Further, in the embodiment, which of the systems authenticating the login should be given priority may be individually set for each extension number.

The specification unit 15c receives operator operations in order to specify the extension numbers for which the plural terminal registration mode is given priority higher than that of the MAC address authentication and manages the setting table 14a on the basis of the specified content while updating the setting table 14a. The setting table 14a, as shown in FIG. 3, includes a column in order to specify whether or not the MAC authentication is set, and a column in order to specify the presence or absence of the setting of the plural registration mode for each extension number. For instance, MAC authentication is set to extension numbers 2000, 3000, 4000, 5000, respectively, and among of them, the extension numbers 2000 and 4000 are each set the plural registration modes. As regards the extension number 2000, it is explicitly specified to give the priority over the plurality registration mode. Thereby, to authenticate the extension number 2000, the plurality registration mode is given higher priority than that of the MAC address authentication. The schematic view of FIG. 3 may be used as it is for design of a user interface window. Next, operations in the given configuration will be described.

Figure 4:
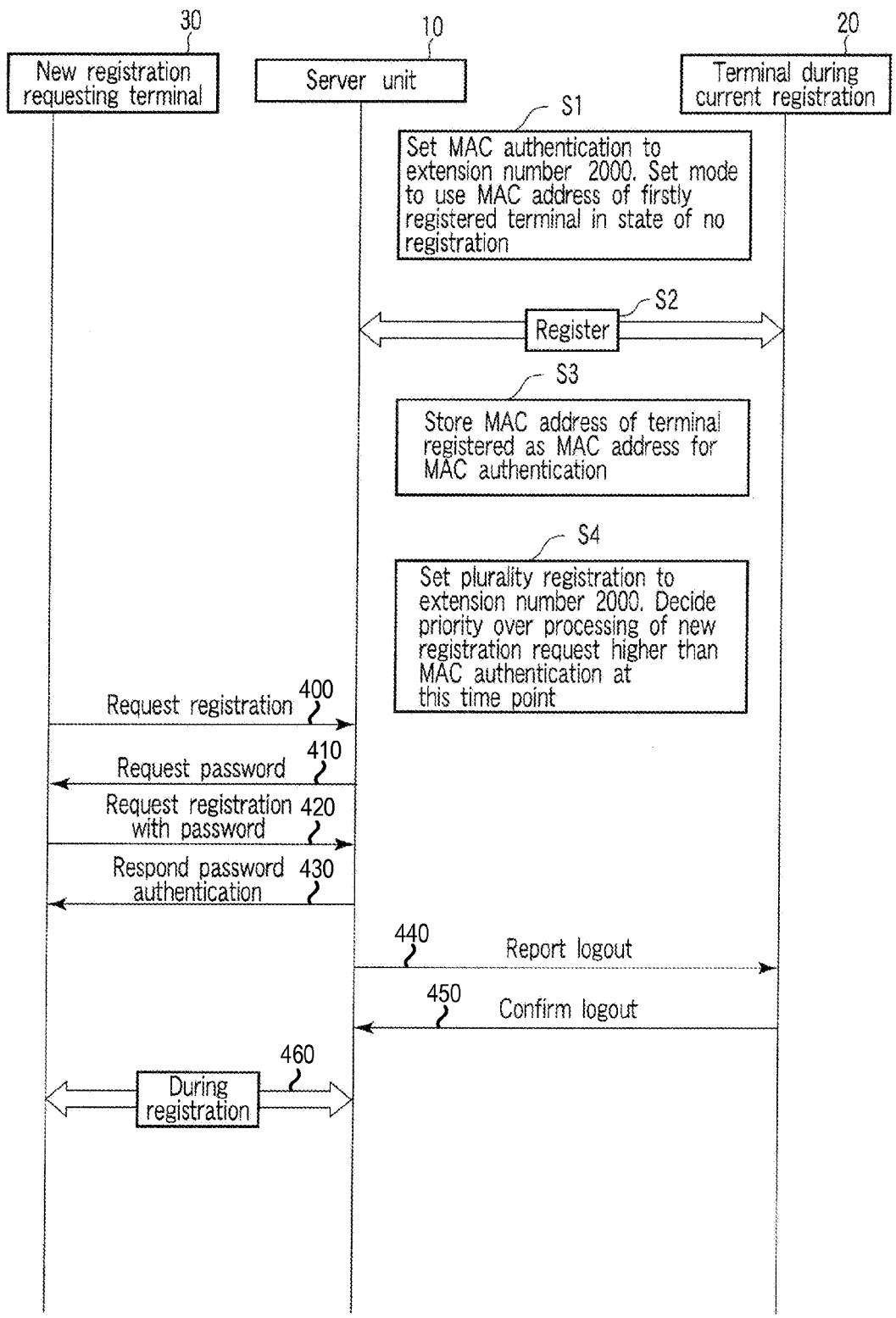
FIG. 4 is a sequence view depicting an example of a processing procedure in terminal authentication of the embodiment regarding the invention.
Figures 5, 6, 7, 8:
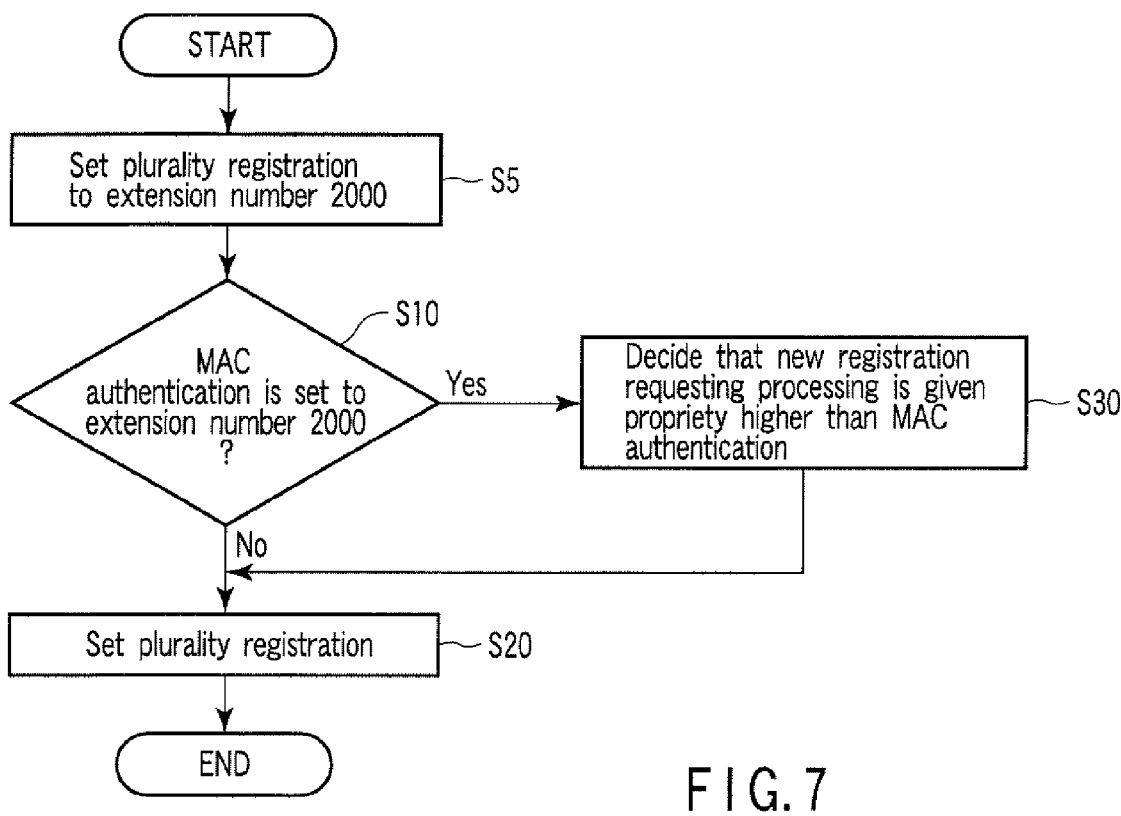
FIG. 5 is a view depicting an example of data to be stored in the server unit 10 in MAC address authentication.
FIG. 6 is a view depicting an example of data to be stored in the server unit 10 in a plural registration mode.
FIG. 7 is a flowchart depicting an example of processing regarding Block S4 of FIG. 4.
FIG. 8 is a view depicting another example of data to manage which of MAC authentication and new registration in a plural registration mode should be given priority.

FIG. 4 shows a sequence view illustrating an example of a processing procedure in terminal authentication. In the following description, a terminal now being in registration is set to the IPT 20, and the Soft IPT 30 is set to the new registration requesting terminal 30. In FIG. 4, the server unit 10 sets the MAC authentication to the extension number 2000 (Block S1). In the mode of the MAC address authentication, a MAC address of a terminal which has been firstly registered from a state of no registration is used. When the IPT 20 requests its registration through the extension number 2000 to the server unit 10, the server unit 10 registers the IPT 20 (Block 52), and authenticates the MAC address of the IPT 20 as a MAC address in order to use for the authentication after this. An example, data shown in FIG. 5 is stored in the server unit 10. FIG. 5 shows that the MAC address of the IPT 20 is 01-02-03-04-05-06 as an example.

Next, it is assumed that the server unit 10 sets the plural registration mode for the extension number 2000 as an object (Block S4). The server unit 10 then stores the data showing the specification of the plural registration mode for the extension number 2000 together with a password (1234567) as shown in FIG. 6.

FIG. 7 shows a flowchart illustrating an example of the processing regarding Block S4 of FIG. 4. If the plural registration mode is set (Block S5), the server unit 10 firstly checks the presence or absence of the setting of the MAC authentication for the extension number 2000 with the plurality registration mode set thereto (Block S10). According to the setting table 14a of FIG. 3, the MAC authentication is set for the telephone system. Therefore, the server unit 10 determines to give priority over the processing of the new registration request in the plural registration mode higher than that of the MAC authentication (Block S30). After passing through such a process, the plural registration mode is set. If the MAC authentication has not been set (extension number 1000), the plural registration mode becomes valid as it is.

Returning to FIG. 4, it is assumed that a registration request is made through the extension number 2000 from the Soft IPT 30 that becomes a new registration requesting terminal (item 400). In the embodiment then the processing of registering the Soft IPT 30 is given priority higher than that of the MAC address authentication processing, and a password request is sent from the server unit 10 to the Soft IPT 30 (item 410). According to the password request, the Soft IPT 30 returns the registration request to the server unit 10 together with the password (item 420). The server unit 10 performs password checking, and if the checking has completed normally, the server unit 10 returns a password authentication response to the Soft IPT 30 (item 430). Then, the server unit 10 sends a logout request to the IPT 20 during current registration (item 440). When a logout confirmation message is returned from the IPT 20 to the server unit 10, after this, the Soft IPT 30 is brought into a registration state (items 450 and 460).

According to the existing technique, if the MAC address authentication is set to the IPT 20, even if the plural registration mode is specified, the MAC address authentication is still maintained valid. Therefore, as long as the operator operates to release the MAC address authentication, the Soft IPT 30 cannot be registered in the telephone system.

Conversely, in the embodiment, if the plural registration mode is set to the server unit 10, since this setting automatically makes the MAC address authentication void, the telephone system takes preference over the processing of the new registration request from the time point when the plural registration mode is set. Therefore, there is no need for the operator of the server unit 10 to be aware of whether or not the MAC address authentication has been set. Accordingly, the operator may omit its manual operation, the system becomes handy and there is no possibility of operating incorrectly. Furthermore, the MAC address authentication and the plural registration mode do not compete with each other, and the matching therebetween may be achieved. In other words, the existing correspondence in terminal authentication is expanded, and the convenience is further improved.

Moreover, in the embodiment, the data, showing which of the MAC address authentication and the new registration mode should be given its priority for each extension number, is stored in the server unit 10 in, for example, the form of the setting table 14a. That is, not assigning the priority of the new registration to all the extension numbers, but the priority is selectively assigned to the extension numbers. Thereby, for example, an operation may be actualized, which the priority of new registration is given over the extension number 2000; however, it is not given over the extension 4000, and the MAC address authentication has been given preference until the operator consciously turns off the MAC address authentication. In other words, the MAC address authentication may be made void only for the specified extension number. The setting table 14a may manage that which of the MAC address authentication and the new registration mode should be taken preference together with other information, or may only specify the preference for each extension number as shown in FIG. 8.

Figure 9:
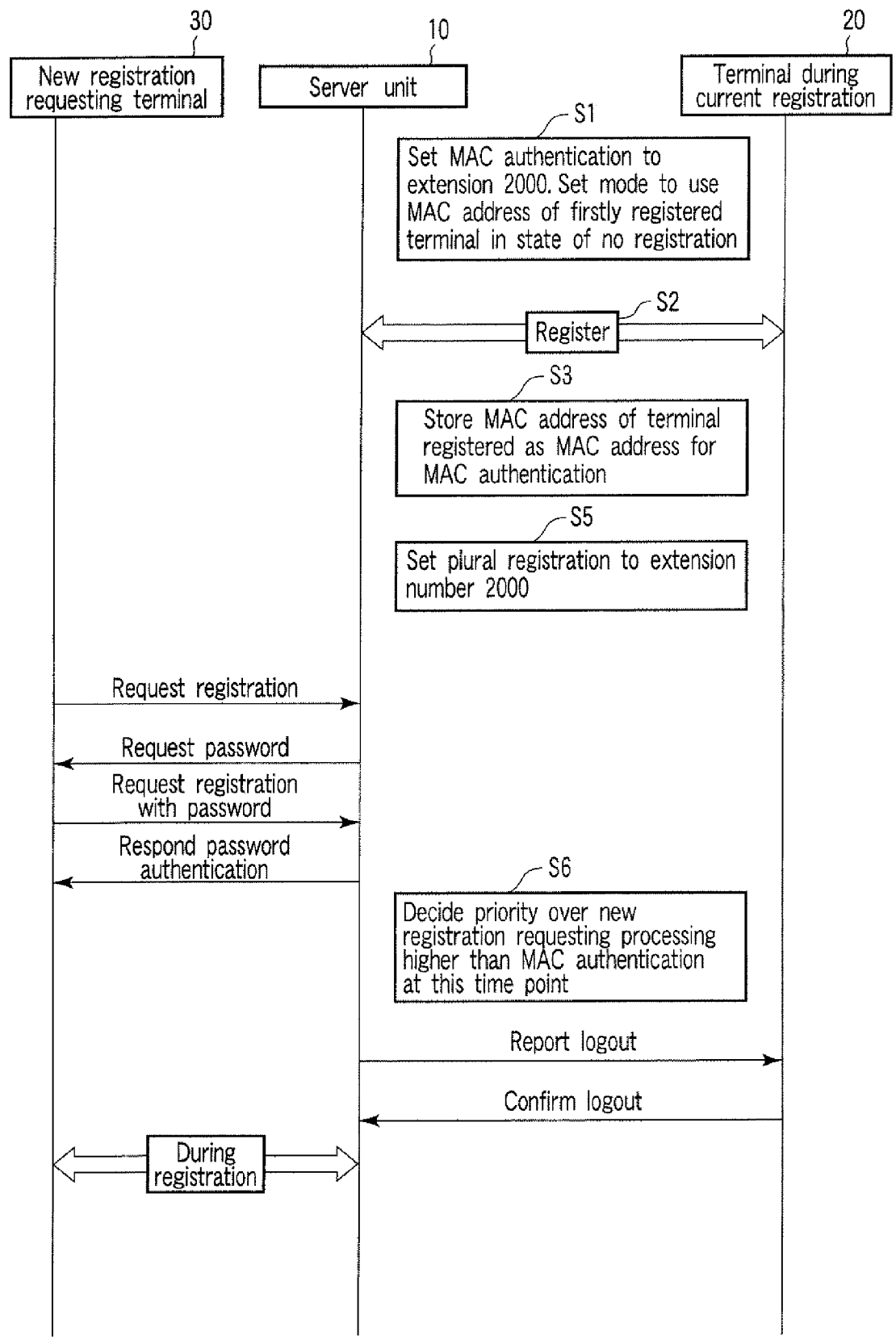
FIG. 9 is a sequence view depicting other example of the processing procedure in the terminal authentication of the embodiment regarding the invention.

Further, as regards the timing to decide that the processing of the new registration request is given the preference higher than the MAC address authentication, the timing is not limited to the case in Block S4 and other time point is acceptable. For instance, as shown in FIG. 9, the MAC address authentication may be made void when the registration request is issued from the new registration requesting terminal after the setting of the plural registration mode and after the time point when the password checking has been completed normally and the authentication has been completed (Block S6).

Figure 10:
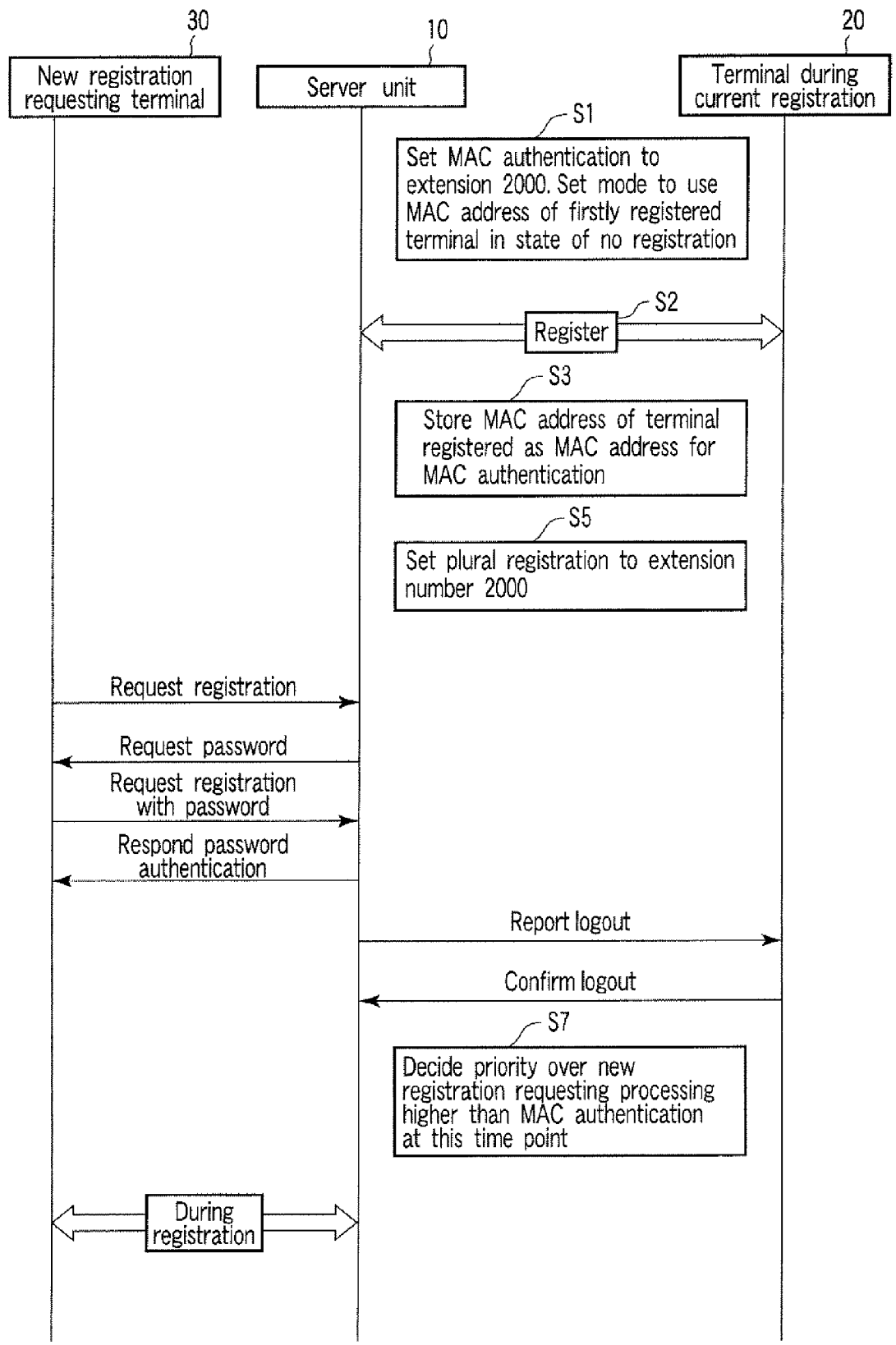
FIG. 10 is a sequence view depicting further example of the processing procedure in the terminal authentication of the embodiment regarding the invention.

Or, as shown in FIG. 10, the MAC address authentication may be made void after the time point when the password checking has been completed, the logout has been requested to the currently registration terminal, and further the logout of the currently registration terminal has been confirmed by the server unit 10 (Block S7). Or the MAC address authentication may be made void at the time point when the defined time period has elapsed without any response after the request for the logout.

Figure 11:
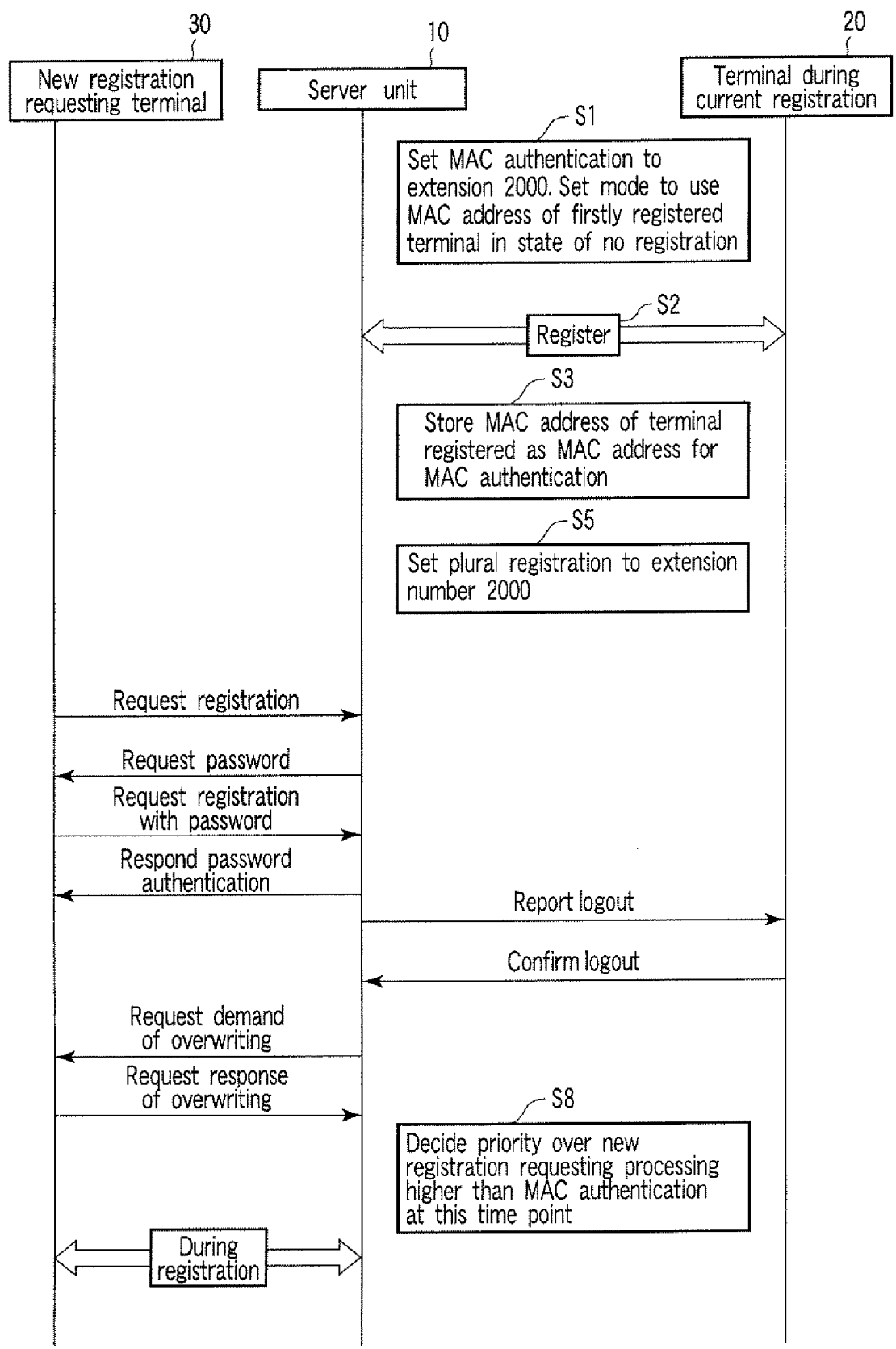
FIG. 11 is a sequence view depicting further example of the processing procedure in the terminal authentication of the embodiment regarding the invention.

Further, as shown in FIG. 11, after the logout of the currently registration terminal is confirmed, moreover, the presence of the currently registration terminal is reported to the user of the new registration requesting terminal, the existing user has been in registration is also reported to the user, and then, the overwriting request of the data is required. Then, the MAC address authentication may be made void after the time point when the response for the notification is sent from the user (Block S8). In this way, adding the further conditions to the invalidation of the MAC address authentication sequentially enables the restriction strictly step by step and an aspect of security becomes advantageous.

As mentioned above, it is enabled to provide the telephone system which simplifies the manual operation of the operator and intends to cope with both security and convenience, and a main unit and a terminal registration method therefor.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fail within the scope and spirit of the inventions.

What is claimed is:

1. A telephone system, comprising:
a plurality of telephone terminals configured to make telephone communication via a packet network; and a main unit which receives a login request from each of the telephone terminals via the packet network, wherein the main unit comprises:
  an authentication processing unit which performs login authentication processing for each of the telephone terminals by media access control (MAC) address authentication that refuses logins from telephone terminals differing in MAC address from a telephone terminal that has been allowed to log in firstly even if the logins are made by the same extension numbers; and
  a mode specification unit which receives specification of a plural terminal registration mode that exclusively allows the simultaneous login by the same extension numbers from a plurality of telephone terminals having different MAC addresses, wherein
  the authentication processing unit gives priority over the plural terminal registration mode higher than the MAC address authentication and makes the MAC address authentication void in the plural terminal registration mode.

2. The telephone system according to claim 1, wherein the main unit further includes a priority specification unit so as to specify an extension number over which the plurality terminal registration mode is given priority higher than the MAC address authentication, and the authentication processing unit makes the MAC address authentication void only for the extension number specified by the priority specification unit in the plural terminal registration mode.

3. The telephone system according to claim 1, wherein: when a login request from other telephone terminal having the same extension number as that of a telephone terminal during login is made,
the authentication processing unit makes the MAC address authentication void after a time point when password checking with the login request from the other telephone terminal has been completed normally.

4. The telephone system according to claim 3, wherein the authentication processing unit makes the MAC address authentication void after a time point when a logout of the telephone terminal during login corresponding to the login request from the other telephone terminal has been confirmed.

5. The telephone system according to claim 4, wherein the authentication processing unit reports presence of the logged out telephone terminal to a user of a telephone terminal of the login request origin after the logout has been confirmed, and makes the MAC address authentication void after a time point when a response from the user for the report has been reached.

6. The telephone system according to claim 3, wherein: after a logout request to the telephone terminal during login has been made corresponding to the login request from the other telephone terminal, when a state of no response to the logout request has elapsed for a defined time period,
the authentication processing unit makes the MAC address authentication void.

7. A main unit which is provided for a telephone system including a plurality of telephone terminals configured to make telephone communication via a packet network and receives a login request from each of the telephone terminals via the packet network, comprising:
  an authentication processing unit which performs login authentication processing for each of the telephone terminals by media access control (MAC) address authentication that refuses logins from telephone terminals differing in MAC address from a telephone terminal that has been allowed to log in firstly even if the logins are made by the same extension numbers; and
  a mode specification unit which sets the main unit into a plural terminal registration mode that exclusively allows the simultaneous login by the same extension numbers from a plurality of telephone terminals having different MAC addresses, wherein
  the authentication processing unit gives priority over the plural terminal registration mode higher than the MAC address authentication and makes the MAC address authentication void in the plural terminal registration mode.

8. The main unit according to claim 7, further includes a priority specification unit so as to specify an extension number over which the plurality terminal registration mode is given priority higher than the MAC address authentication, and wherein
the authentication processing unit makes the MAC address authentication void only for extension number specified by the priority specification unit in the plural terminal registration mode.

9. The main unit according to claim 7, wherein: when a login request from other telephone terminal having the same extension number as that of a telephone terminal during login is made,
the authentication processing unit makes the MAC address authentication void after a time point when password checking with the login request from the other telephone terminal has been completed normally.

10. The main unit according to claim 9, wherein the authentication processing unit makes the MAC address authentication void after a time point when a logout of the telephone terminal during login corresponding to the login request from the other telephone terminal has been confirmed.

11. The main unit according to claim 10, wherein the authentication processing unit reports presence of the logged out telephone terminal to a user of a telephone terminal of the login request origin after the logout has been confirmed, and makes the MAC address authentication void after a time point when a response from the user for the report has been reached.

12. The main unit according to claim 9, wherein: after a logout request to the telephone terminal during login has been made corresponding to the login request from the other telephone terminal, when a state of no response to the logout request has elapsed for a defined time period,
the authentication processing unit makes the MAC address authentication void.

13. A terminal registration method for a device which receives login requests from a plurality of telephone terminals configured to make telephone communication via a packet network by a media access control (MAC) address authentication, the MAC address authentication being an authentication system which refuses logins from telephone terminals differing in MAC address from a telephone terminal that has been allowed to log in firstly even if the logins are made by the same extension numbers, the method comprising:
  setting the device to a plural terminal registration mode that exclusively allows the simultaneous login by the same extension numbers from a plurality of telephone terminals having different MAC addresses;

giving priority over the plural terminal registration mode higher than the MAC address authentication by the device; and making the MAC address authentication void in the plural terminal registration mode by the device when a login request from other telephone terminal having the same extension number as that of a telephone terminal during login is made and after a time point when password checking with the login request from the other telephone terminal has been completed.

14. The terminal registration method according to claim 13, wherein the making makes the MAC address authentication void after a time point when a logout of the telephone terminal during login corresponding to the login request from the other telephone terminal has been confirmed.

15. The terminal registration method according to claim 14, further comprising:

reporting presence of the logged out telephone terminal to a user of a telephone terminal of the login request origin after the logout has been confirmed, wherein the making makes the MAC address authentication void after a time point when a response from the user for the report has been reached.

16. The terminal registration method according to claim 13, further comprising requesting logout to the telephone terminal during login in response to the login request from the other telephone terminal, and wherein when a state of no response to the logout request has elapsed for a defined time period; the making makes the MAC address authentication void.

* * * * *